United States Patent
Nagai

(10) Patent No.: US 6,781,958 B1
(45) Date of Patent: Aug. 24, 2004

(54) MONITOR CIRCUIT FOR EXTRACTING ADMINISTRATION INFORMATION IN A COMMUNICATION FRAME

(75) Inventor: Hiroshi Nagai, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/520,495

(22) Filed: Mar. 8, 2000

(30) Foreign Application Priority Data

Mar. 18, 1999 (JP) .......................................... 11-074532

(51) Int. Cl.⁷ .............................................. G06F 11/00
(52) U.S. Cl. ...................................................... 370/241
(58) Field of Search .......................... 370/395.72, 241, 370/242, 243, 248, 249, 907

(56) References Cited

U.S. PATENT DOCUMENTS

| | | | | |
|---|---|---|---|---|
| 4,575,844 A | * | 3/1986 | Kosuge et al. | 370/354 |
| 5,276,810 A | * | 1/1994 | Kitamura et al. | 711/118 |
| 5,323,367 A | * | 6/1994 | Tamura et al. | 369/30.36 |
| 5,831,980 A | * | 11/1998 | Varma et al. | 370/395.72 |
| 6,314,489 B1 | * | 11/2001 | Nichols et al. | 711/1 |

* cited by examiner

Primary Examiner—Chi Pham
Assistant Examiner—Keith M. George
(74) Attorney, Agent, or Firm—Fish & Richardson P.C.

(57) ABSTRACT

A monitor circuit 1 incorporates a switch 4, a switch 5, a counter 6, a high-speed RAM 7, a counter 8 and a low-speed RAM 9. The monitor circuit 1 is a circuit structured such that the switch 4 and the switch 5 are switched in accordance with the level of an input signal to cause data for one row which concerns SOH in the frame of STM which is received as received data 2 to be stored in the high-speed RAM 7. In a period in which data concerning payload is received, a process for storing data for one row which concerns the SOH stored in the high-speed RAM 7 in the low-speed RAM 9 is repeatedly performed. Thus, data concerning all of the SOH which constitute one frame of the STM is extracted so as to output the extracted data items as an output signal 10.

5 Claims, 1 Drawing Sheet

MONITOR CIRCUIT FOR EXTRACTING ADMINISTRATION INFORMATION IN A COMMUNICATION FRAME

BACKGROUND OF THE INVENTION

1. Field of the Invention

The present invention relates to a monitor circuit for monitoring administration information of a frame received during high-speed data communication.

2. Description of the Related Art

SDH (Synchronous Digital Hierarchy) is one of world standards for optical transmission network for realizing high-speed data communication. The SDH has a synchronous transfer mode called an STM (Synchronous Transfer Module) as data multiplexing unit. The bit rate of STM-1 (Synchronous Transfer Module Level One) which is the base of the STEM is 155.52 Mb/s.

The frame of the STM is constituted by a two-dimensional byte array composed of 9 rows×270 columns. A portion of 9 rows×9 columns in head is called a section overhead (hereinafter called an "SOH"). A next portion composed of 9 rows×261 columns is called a payload. The SOH is an administration portion having a frame synchronous signal and maintenance information added to the payload. Actual data, which has been multiplexed, is accommodated in the payload.

Since one frame of the STM is transferred at 125 microseconds, the bit rate varies according to the number of bytes for data concerning 1 row×1 column. Since data in 1 row×1 column is 1 byte data in STM-1, the bit rate is 155.52Mb/s because 9 rows×270 bytes×(1/125 microseconds) =155.52 Mb/s. The SDH has several standards including, for example, STM-4 having a bit rate which is four times the bit rate of STM-1 such that data of 1 row×1 column is four bytes, STM-16 having a bit rate which is 16 times the foregoing bit rate such that data of 1 row×1 column is 16 bytes and STM-64 having a bit rate which is 64 times the foregoing bit rate such that data of 1 row×1 column is 64 bytes.

The structure of the hardware for performing data communication by the SDH with which transfer and receipt concerning one frame are performed at high speed requires a high-speed RAM (Random Access Memory) adaptable to the high-speed operation or a plurality of low-speed RAM units. That is, when a low-speed RAM is employed, the operation speed of the low-speed RAM is a bottleneck. Therefore, a high-speed RAM has to be substituted for the low-speed RAM or a changeover structure must be employed in which a plurality of low-speed RAM units are provided. Since the bit rate of, for example, STM-64, is 64 times the bit rate of STM-1, a RAM having a capacity which is 64 times the bit rate of STM-1 is required. However, there arises a problem that the high-speed RAM is a costly unit and a satisfactorily large capacity cannot be realized. Another problem arises in that the low-speed RAM having a sufficiently large capacity and, however, incorporating a large number of signal lines encounters a fact that the circuit becomes too complicated and enlarged excessively.

SUMMARY OF THE INVENTION

An object of the present invention is to provide a low-cost and small-size monitor circuit which is used in a receiving apparatus for receiving test data of high-speed data communication and which monitors administration information of a received frame.

A testing apparatus in which pseudo data is transferred or received is generally used to evaluate the data communication. Also data communication using the SDH is arranged similarly. That is, the frame is structured such that valid administration data is stored in only the SOH. Moreover, pseudo data is stored in the payload. Thus, data communication which is performed by the SDH can be tested.

Therefore, if the testing apparatus for testing data communication is arranged such that the receiver unit is able to validly evaluate only administration data of the SOH, a required function can be realized. In the foregoing case, a necessity for structuring the receiver unit to be the same as the actual receiver unit for receiving SDH communication data can be eliminated.

According to a first aspect of the present invention, there is provided a monitor circuit for extracting administration information of a received communication frame, the monitor circuit comprising:

a storage circuit for storing administration information; and a change-over switch for receiving the communication frame and performing change-over to output administration information to the storage circuit only when administration information of the communication frame is received in response to a predetermined input signal.

In the first aspect of the present invention, the monitor circuit is structured such that the storage circuit stores administration information and the change-over switch receives the communication frame to output administration information to the storage circuit only when administration information of the communication frame is received in response to the predetermined input signal.

Therefore, in the first aspect of the present invention, the administration information of the received communication frame can be extracted easily. Thus, the circuit can be simplified. Moreover, the size of the storage circuit for storing administration information can be reduced. Therefore, a small-size monitor circuit can be provided. Although the storage circuit required when high-speed data communication is performed is a costly circuit, the cost of the monitor circuit can be reduced because only a minimum storage capacity is required.

According to a second aspect of the present invention, there is provided a monitor circuit according to the first aspect of the present invention, wherein the communication frame is constituted by a plurality of administration information items and communication data, the storage circuit incorporates:

a high-speed storage circuit which temporarily stores an administration information item among the plural administration information items which is input from the change-over switch and which is capable of performing a storing process at high speed and a low-speed storage circuit which receives the administration information temporarily stored in the high-speed storage circuit, which stores all of the plural administration information items and which is capable off performing a storing process at low speed, and the change-over switch is structured to perform changeover between output of the communication frame to the high-speed storage circuit and output from the high-speed storage circuit to the low-speed storage circuit such that when the change-over switch receives an administration information item of the communication frame, the change-over switch outputs the administration information item to the high-speed storage circuit and when the change-over switch receives one communication data item of the communication frame, the change-over switch outputs the administration information item stored in the high-speed storage circuit to the low-speed storage circuit so that all of the plural administration Information items of the communication frame are stored and extracted into low-speed storage circuit.

According to the second aspect of the present invention, there is provided a monitor circuit according to the first aspect of the present invention, wherein the communication frame is constituted by a plurality of administration information items and communication data. The storage circuit incorporates the high-speed storage circuit and the low-speed storage circuit. The high-speed storage circuit, at high speed, temporarily stores an administration information item among the plural administration information items which is input from the change-over switch. The low-speed storage circuit receives the administration information Item temporarily stored in the high-speed storage circuit and, at low speed, stores all of the plural administration information items. The change-over switch is structured to perform changeover between output of the communication frame to the high-speed storage circuit and output from the high-speed storage circuit to the low-speed storage circuit. Thus, switching is performed such that when an administration information item in the communication frame is received, the administration information item is output to the high-speed storage circuit. When a communication data in the communication frame is received, the administration information item stored in the high-speed storage circuit is output to the low-speed storage circuit. Thus, all of the plural administration information items in the communication frame are stored and extracted into the low-speed storage circuit.

In the second aspect of the present invention, the monitor circuit is structured such that the high-speed storage circuit is simply required to temporarily store one administration information if the communication frame is composed of a plurality of administration information items and communication data. Therefore, only a minimum storage capacity is required for the high-speed storage circuit. Hence it follows that a low-cost monitor circuit can be realized. Since the low-speed storage circuit is simply required to receive and store administration information temporarily stored in the high-speed storage circuit, the circuit structure can be simplified. As a result, a small-size monitor circuit can be provided.

According to a third aspect of the present invention, there is provided a monitor circuit according to the second aspect of the present invention, wherein the communication frame is for use in SDH.

The third aspect of the present invention permits the monitor circuit to be applied to the SDH standardized as high speed data communication. Therefore, a monitor circuit which is satisfactory from a viewpoint of practical use can be provided.

According to a fourth aspect of the present invention, there is provide a monitor circuit according to the second or third aspect of the present invention, wherein the predetermined input signal is an identification signal for identifying a period in which the administration information item of the communication frame is input and a period in which the communication data item is input.

In the fourth aspect of the present invention, the monitor circuit is structured such that the predetermined input signal is the identification signal for identifying two data items. Therefore, the foregoing signal can easily be realized by using only two signal levels which are, for example, a high level and a low level. Therefore, the structure of the circuit can be simplified and the size of the monitor circuit can be reduced.

According to a fifth aspect of the present invention, there is provided a monitor circuit comprising a counter for receiving the predetermined input signal and counting the number of input times of the administration information items until a predetermined number of times at which all of the plural administration information items of the communication frame are stored and extracted into the low-speed storage circuit, wherein when the counter has counted the predetermined number of times, all of the plural administration information items of the communication frame stored in the low-speed storage circuit are output.

According to the fifth aspect of the present invention, there is provided the monitor circuit according to the fourth aspect, wherein the counter receives the predetermined input signal and counts the number of input times of the administration information items until a predetermined number of times at which all of the plural administration information items of the communication frame are stored and extracted into the low-speed storage circuit, wherein when the counter has counted the predetermined number of times, all of the plural administration information items of the communication frame stored in the low-speed storage circuit are output.

In the fifth aspect of the present invention, there has the structure that all of the plural administration information items in the communication frame have been stored in the low-speed storage circuit. Then, the administration information items are automatically output from the low-speed storage circuit. Therefore, a monitor circuit which is satisfactory from a viewpoint of practical use can be provided.

DETAILED DESCRIPTION OF THE PRESENT INVENTION

Figure 1:
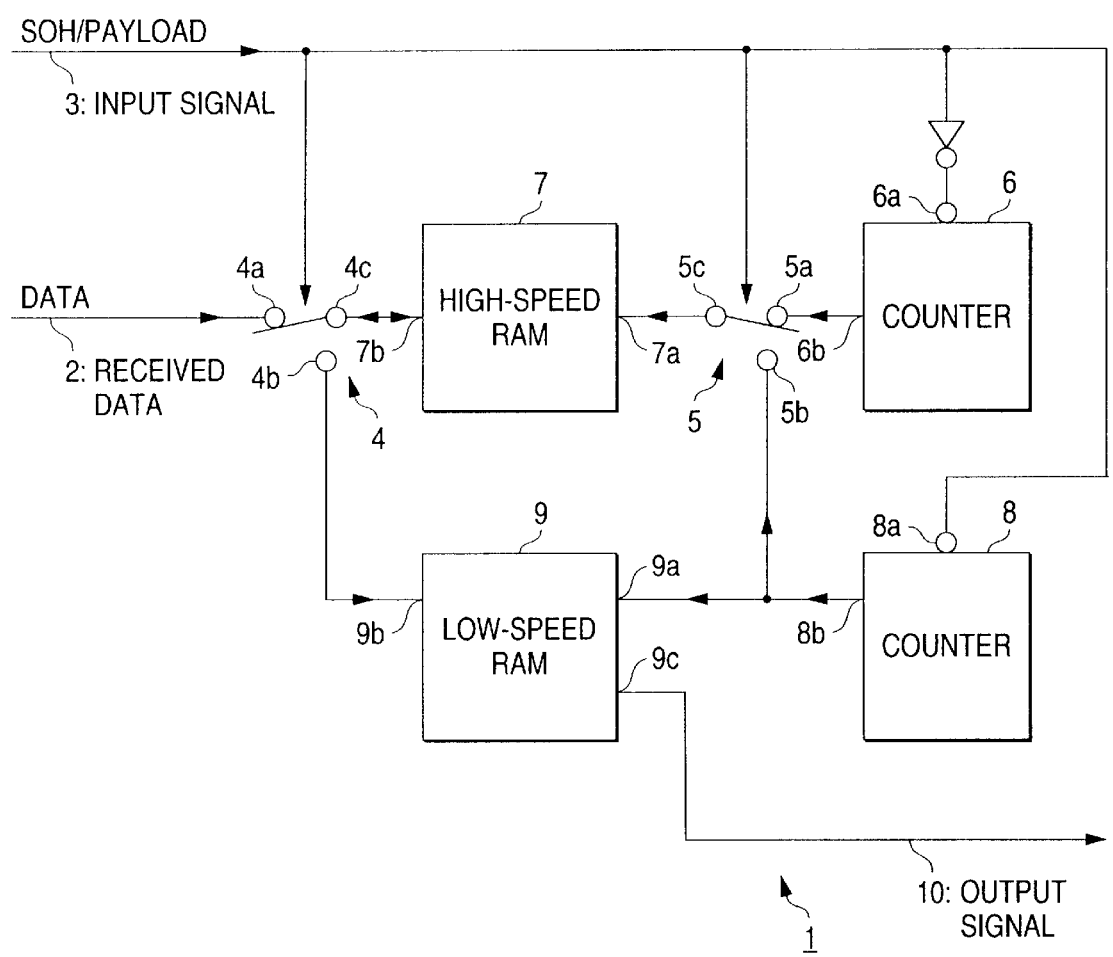
FIG. 1 is a schematic view showing a monitor circuit 1 according to the present invention.

Referring to FIG. 1, an embodiment of a monitor circuit 1 according to the present invention will now be described.

FIG. 1 is a schematic view showing the monitor circuit 1 according to the present invention. The monitor circuit 1 is a circuit for extracting, from a frame of the received STM, SOH having administration information stored therein to evaluate and test SDH data communication.

Referring to FIG. 1, the monitor circuit 1 incorporates a switch 4, a switch 5, a counter 6, a high-speed RAM 7, a counter 8 and a low-speed RAM 9. In accordance with the signal level of an input signal 3, the switch 4 and the switch 5 are switched. Thus, data for one row concerning the SOH, which has been contained in the frame of the STM and which has been input as received data 2 is stored in the high-speed RAM 7. During input of data concerning the payload, data for one row which concerns the SOH and which has been stored in the high-speed RAM 7 is stored in the low-speed RAM 9. The foregoing process is repeated so that data concerning all SOH which constitutes one frame of the STM is extracted so that the monitor circuit 1 outputs data as an output signal 10.

Received data 2 is data input from a receiving circuit (not shown), which is data received by the receiving circuit as a result of SDH data communication, that is, data concerning the frame of the STM.

The input signal 3 is a timing signal. Whether the frame of the STM, which is input from a detection circuit (not shown) and which is input as received data 2, is data concerning the SOH or data concerning the payload is detected by the detection circuit. When the foregoing frame is data concerning the SOH, a high level timing signal is input to the monitor circuit 1. When the foregoing frame is data concerning the payload, a low level timing signal is input.

The switch 4 is a change-over switch for switching a contact 4a or a contact 4b so that the connection with a fixed contact 4c is established. Received data 2 is input to the contact 4a whenever necessary. The fixed contact 4c is connected to an input/output terminal 7b of the high-speed RAM 7. The contact 4b is connected to an input terminal 9b of the low-speed RAM 9. When the contact 4a has been connected to the fixed contact 4c (hereinafter a case where the connection has been established is called "ON" and a case where no connection is established is called "OFF"), received data 2 is output to the high-speed RAM 7. When the contact 4b has been turned on, data stored in the high-speed RAM 7 is output to the low-speed RAM 9. Thus, the foregoing switching is performed.

The switch 5 is a change-over switch for switching a contact 5a or a contact 5b to establish the connection with a fixed contact 5c. The fixed contact 5c is connected to an input terminal 7a of the high-speed RAM 7. The contact 5a is connected to an output terminal 6b of the counter 6. The contact 5b is connected to an output terminal 8b of the counter 8. When the contact 5a has been turned on, an instruction signal to be described later and output from the counter 6 is output to the high-speed RAM 7. When the contact 5b has been turned on, an instruction signal output from the counter 8 is output to the high-speed RAM 7. Thus, the foregoing switching is performed.

The switch 4 and the switch 5 perform switching operations in response to the input signal 3. When the level of the input signal 3 is high, the contact 4a of the switch 4 and the contact 5a of the switch 5 are turned on. When the level of the input signal 3 is low, the contact 4b of the switch 4 and the contact 5b of the switch 5 are turned on.

The counter 6 inverts and receives the input signal 3 from the input terminal 6a through an NOT gate. When the level of the input signal 3 is high, the counter 6 performs counting to output the instruction signal to the high-speed RAM 7 through the switch 5. The instruction signal is a signal indicating the storage address in the high-speed RAM 3 for storing data (data of 1 row×9 columns) for one line which has been contained in received data 2 and which concerns the SOH. The output terminal 6b of the counter 6 is connected to the contact 5a of the switch 5. Therefore, only when the contact 5a has been turned on, the instruction signal is output from the counter 6 to the high-speed RAM 7.

The high-speed RAM 7 has a storage region for storing data (data of 1 row×9 columns) for one line and concerning the SOH. The input/output terminal 7b is connected to the fixed contact 4c of the switch 4, while the input terminal 7a is connected to the fixed contact 5c of the switch 5. When the level of the input signal 3 is high, the contact 4a of the switch 4 and the contact 5a of the switch 5 are turned on. During the foregoing period, data (data of 1 row×9 columns) for one row which concerns SOH and which has been input through the switch 4 as received data 2 is stored in the storage address in response to the instruction signal input from the counter 6 through the switch 5.

When the level of the input signal 3 is low, the contact 4b of the switch 4 and the contact 5b of the switch 5 are turned on. During the foregoing period, the high-speed RAM 7 outputs data (data of 1 row×9 columns) for one row and concerning the SOH and stored in the high-speed RAM 7 to the low-speed RAM 9 through the switch 4 in response to the instruction signal supplied from the counter 8 through the switch 5.

The counter 8 inverts and receives the input signal 3 from the input terminal 8a. When the level of the input signal 3 is not the high level, that is, when the level is the low level, the counter 8 performs counting to output instruction signals from the output terminal 8b to the high-speed RAM 7 and the low-speed RAM 9. The instruction signals which are output from the counter 8 include a signal indicating the storage address in the low-speed RAM 9 for storing data (data of 1 row×9 columns) for one row which is received by the low-speed RAM 9 from the high-speed RAM 7 and which concerns the SOH; and a signal for reading data (data of 1 row×9 columns) for one line concerning the SOH and stored in the high-speed RAM 7. In response to the foregoing signals, reading of data which is performed by the high-speed RAM 7 and storage of data which is performed by the low-speed RAM 9 are simultaneously performed.

The low-speed RAM 9 has a storage region for storing data (data of 9 rows×9 columns) for one row concerning the SOH of the SDH. Thus, data (data of 1 row×9 columns) for one row which is supplied from the high-speed RAM 7 and which concerns the SOH is stored in the storage address indicated by the Instruction signal supplied from the counter 8. When data (data of 9 rows×9 columns) for one row which concerns all of SOH which constitute one frame of the STM has been stored as a result of repeated receipt and storage of data for one row which concerns the SOH from the high-speed RAM 7, the low-speed RAM 9 outputs data (data of 9 rows×9 columns) for one row which concerns the SOH from the output terminal 9c to a display unit (not shown) or the like. Thus, a process for displaying administration information concerning the frame of the received STM is performed.

The input terminal 9b for receiving data (data of 1 row×9 columns) for one row which concerns the SOH from the high-speed RAM 7 is connected to the contact 4b of the switch 4. Therefore, when the contact 4b has been turned on and the instruction signal has been supplied from the counter 8, data (data of 1 row×9 columns) for one row which concerns the SOH and which is supplied from the high-speed RAM 7 is stored. The above-mentioned conditions are satisfied when the level of the input signal 3 is low, that is, when received data 2 is data concerning the payload. Since the quantity of data (data of 1 row×261 columns) concerning the payload is larger than the quantity of data (data of 1 row×9 columns) concerning the SOH, data concerning the SOH can safely be stored in the low-speed RAM 9.

The operation will now be described.

Initially, the operation will now be described which is performed when the level of the input signal 3 is high, that is, the SOH is indicated.

Since the level of the input signal 3 is high, the contact 4a and the contact 5a of the switch 4 and the switch 5 are turned on. Moreover, the counter 6 starts counting to output the instruction signal to the high-speed RAM 7 through the switch 5.

In response to the instruction signal supplied from the counter 6, the high-speed RAM 7 inputs and stores data (data of 1 row×9 columns) for one row which concerns the SOH in the high-speed RAM 7 through the switch 4.

The operation will now be described.

Since the level of the input signal 3 is low, the contact 4b and the contact 5b of the switch 4 and the switch 5 are turned on. Moreover, the counter 8 starts counting to output the instruction signal to the low-speed RAM 9 and the high-speed RAM 7.

In response to the instruction signal supplied from the counter 8, the high-speed RAM 7 outputs stored data (data of 1 row×9 columns) for one row which concerns the SOH to the low-speed RAM 9 through the switch 4. The low-speed RAM 9 stores data (data of 1 row×9 columns) for one row which concerns the SOH and which is supplied from the high-speed RAM 7 to the storage region indicated with the instruction signal supplied from the counter 8.

As described above, data for one row which concerns the payload is input as received data 2 during a period in which the level of the input signal 3 is low. Since the quantity of data (1 row×261 columns) for one row is larger than the quantity of (data of 1 row×9 columns) for one row which concerns the SOH, data concerning the SOH can safely be stored from the high-speed RAM 7 to the low-speed RAP 9 during a period in which data concerning payload is input.

As described above, the monitor circuit 1 is structured such that each of the high level and the low level of the input signal 3 are alternately supplied 9 times for a predetermined time to correspond to time required to transfer one frame. Thus, data (data of 9 rows×9 columns) concerning the SOH among data concerning one frame of the SDH in the form of 9 rows×270 columns is extracted so as to be stored in the low-speed RAM 9. When data concerning all of SOH which constitute one frame of the STM has been stored in the low-speed RAM 9, that is, when input from the high-speed RAM 7 has been performed 9 times, the low-speed RAM 9 outputs data concerning the SOH to the display unit (not shown) or the like through the output terminal 9c. Thus, for example, a process for displaying administration information concerning the frame of the received STM is performed.

Therefore, the monitor circuit 1 according to the present invention requires a high-speed RAM for only storing data for one row which concerns the SOH of the SDH. Hence it follows that the capacity of the high-speed RAM can be reduced. The low-speed RAM is structured to only store data for each row supplied from the high-speed RAM and concerning the SOH and output data concerning the SOH as the output signal 10 after data concerning all of the SOH has been stored. Therefore, the structure of the circuit can be simplified. As a result, a low-cost and small-size circuit for monitoring administration information can be provided.

The present invention is not limited to the foregoing embodiment. A variety of modifications are permitted within the scope of the present invention. The present invention, which can be applied to the high-speed data communication using the SDH, may be applied to another data communication operation if the frame is not constituted by a plurality of rows in a case of the SDH. The present invention may be applied if a protocol using frames each of which is constituted by an administration portion (a header portion)+ data portion is employed. For example, the present invention may be applied to, for example, Ethernet using Ethernet frames and MAPOS (Multiple Access Protocol Over SONET/SDH) As a matter of course, the present invention may be applied to a case where a high-speed transfer rate not lower than STM-64 is employed as the standard for the SDH.

The determination whether or not the low-speed RAM 9 has stored data which concerns all of the SOH may be performed such that the counter 8 counts the signal level of the supplied input signal 3 (corresponding to the counter claimed in claim 5). When the low level has been counted 9 times, a determination is made that data concerning all of the SOH has been stored in the low-speed RAM 9. As an alternative to this, the determination may be made that data concerning all of the SOH has been stored when the storage region of the low-speed RAM 9 has been filled.

According to the first aspect of the present invention, administration information of the received communication frame can easily be extracted. Therefore, the circuit can be simplified and reduction in the size of the storage circuit for storing administration information is permitted. As a result, a monitor circuit having a small size can be provided. Although the high-speed storage circuit required to perform high-speed data communication is a costly circuit, the cost of the monitor circuit can be reduced because only a minimum storage capacity is required.

According to the second aspect of the present invention, the monitor circuit is structured such that the high-speed storage circuit simply and temporarily stores one administration information item if the communication frame is composed of a plurality of administration information items and communication data. Therefore, the high-speed storage circuit is required to have a minimum storage capacity, enabling a low-cost monitor circuit to be realized. Since the low-speed storage circuit is required to only input and store the administration information item temporarily stored in the high-speed storage circuit, the structure of the circuit can be simplified. As a result, a monitor circuit having a small size can be provided.

According to the third aspect of the present invention, there can be applied to the SDH which has been standardized as high speed data communication. Therefore, a monitor circuit which is satisfactory from a viewpoint of Practical use can be provided.

According to the fourth aspect of the present invention, the monitor circuit has the structure that the predetermined input signal is the identification signal for identifying two data items. Therefore, the identification signal can easily be realized by using two signal levels which are, for example, the high level and the low level. As a result, the structure of the circuit can be simplified and the size of the monitor circuit can be reduced.

According to the fifth aspect of the present invention, the monitor circuit has the structure that all of the plural administration information items of the communication frame has been stored in the low-speed storage circuit. Then, the administration Information items are automatically output from the low-speed storage circuit. Therefore, a monitor circuit which is satisfactory from a viewpoint of practical use can be provided.

What is claimed is:

1. A monitor circuit for extracting administration information in a communication frame including a plurality of administration information and a plurality of communication data, the monitor circuit comprising:

a storage circuit including:
(a) a high-speed storage circuit temporarily storing one of the plurality of administration information inputted through the change-over switch at high speed; and
(b) a low-speed storage circuit receiving the one of the plurality of administration information from the high-speed storage circuit through the change-over switch, the low-speed storage circuit storing all of the plurality of administration information at low speed, and a change-over switch to receive the communication frame, the change-over switch operable to output the administration information in the communication frame to the storage circuit in accordance with a predetermined input signal only when administration information is received, wherein the change-over switch is changed over to output the one of the plurality of administration information to the high-speed storage circuit when the change-over switch receives the one of the plurality of administration information in the communication frame, wherein the change-over switch is changed over to output the one of the administration information stored in the high-speed storage circuit to the low-speed storage circuit when the change-over switch receives one of the plurality of communication data in the communication frame, and wherein all of the plurality of administration information in the communication frame are stored and extracted in the low-speed storage circuit.

2. The monitor circuit as claimed in claim 1, wherein the communication frame is a communication frame for use in SDH.

3. The monitor circuit as claimed in claim 1, wherein the predetermined input signal is an identification signal for identifying a period in which the administration information in the communication frame is input and a period in which the communication data is input.

4. The monitor circuit as claimed in claim 3, comprising:

a counter to receive the predetermined input signal, the counter operable to count the number of administration information received by the counter until a predetermined number of times that all of the plurality of administration information in the communication frame are stored and extracted in the low-speed storage circuit, wherein all of the plurality of administration information in the communication frame stored in the low-speed storage circuit are outputted when the counter has counted the predetermined number of times.

5. The monitor circuit of claim 1 wherein the storage circuit comprises a plurality of memory locations and wherein the change-over switch operates to output administration information to a selected one of the plurality of memory locations.

* * * * *